Aug. 12, 1947.   C. W. JOHNSON   2,425,538
METHOD AND MEANS FOR PRODUCING SLEEP BY CREATING
THE ILLUSION OF A WINKING EYE
Filed June 6, 1946
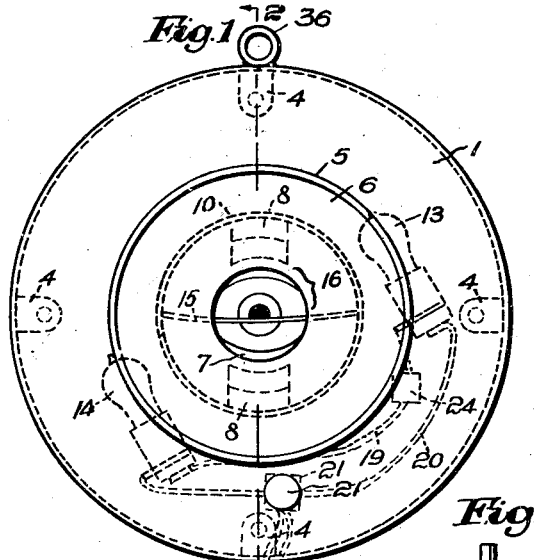
Inventor:
Chester W. Johnson,
Attys Patented Aug. 12, 1947

2,425,538

UNITED STATES PATENT OFFICE 2,425,538

METHOD AND MEANS FOR PRODUCING SLEEP BY CREATING THE ILLUSION OF A WINKING EYE

Chester W. Johnson, Bridgewater, Mass.

Application June 6, 1946, Serial No. 674,906

9 Claims. (Cl. 128—1)

This invention relates to a method and means for inducing sleep in persons desiring to sleep.

In order that the principle of the invention may be readily understood, I have in the accompanying drawing disclosed a single embodiment of the means of my invention and by which my method may be most effectively carried out.

In said drawing:

Fig. 1 is a front elevation of the device or apparatus constituting the means of my invention;

Fig. 2 is a vertical, substantially central section on the line 2—2 of Fig. 1;

Fig. 3 is a rear elevation of the construction shown in Fig. 1, but with the back cover removed;

Fig. 4 is a view similar to Fig. 3 but with the back cover in place;

Fig. 5 is a detail in vertical section showing the eye-simulation;

Figs. 6 and 7 are respectively a plan view and a side elevation showing one form of means whereby the electric current is at very frequent, substantially regular intervals cut off from the electric light bulb transmitting light rays through the upper portion of the eye-simulation, to create an impression of winking;

Figs. 8 and 9 are respectively a side elevation and an end elevation of another form of means for the same purpose;

Fig. 10 is a diagrammatic view of an open eye and a winked eye; and

Fig. 11 is a diagram of the electric circuit employed.

The object of my invention is to provide a device or small apparatus which is light and easily handled and which may be set up in a bedroom, a sleeping apartment or in any other appropriate place, of the person desiring to sleep, as, for example, by hanging the same upon a wall or supporting the same upon a bureau, which device or apparatus constantly repeats at very frequent, substantially regular intervals an act or operation upon which a person desiring to sleep may concentrate his or her attention, thus driving from mind other thoughts that would tend to keep him or her awake. Everyone knows of the practice or theory of "counting sheep" in order to induce sleep in a person afflicted with insomnia. Such counting of sheep or the like is an expedient for concentrating the mind upon something that will, if successful, drive out thoughts tending to keep one awake, as, for example, business worries, etc., and thus bring the person into a frame of mind inducing sleep.

I am aware that it has been proposed to employ a device on the order of a small blinker light to induce sleep, such device being shown in French patent to Guilhaumon No. 29,863, Nov. 10, 1925. I myself, as a first proposed embodiment of my invention tried a small blinker light for the purpose, but found it entirely ineffective to produce sleep. It was not until the idea of simulating a slowly winking eye occurred to me and I constructed and tested the same that I was successful. I believe that the effect of a slowly winking eye is a gentle hypnotic or suggestive influence, and that a person desiring sleep and being in bed or in a position to sleep, watching a slowly winking eye, unconsciously begins to imitate with his own eyes such simulated eye winking. If such person continues unconsciously to wink in imitation of the simulated winking eye, he or she will speedily fall asleep. It is a matter of common knowledge and observation that if one of several persons in a room begins to yawn, the other persons begin to imitate. I have by my invention availed myself of this unconscious tendency to imitate.

In accordance with my invention I provide upon a suitable, relatively small, easily handled support or member the simulation of an eye, preferably a human eye, and I create upon said support or member the illusion of the winking of such eye at very frequent, substantially regular intervals. Tests made with the device prove that it is effective for the said purpose. I create the illusion of the winking of the artificial eye by providing a source or sources of artificial light in the rear of the said eye upon said support or member, so that the light rays from such source or sources of artificial light are transmitted through the eye-simulation on said support or member to the person watching the same and, at constant, very frequent intervals such as every second or every two seconds, I interrupt the light rays through the upper portion or half of the eye-simulation but constantly preserve the light rays through the lower portion of the eye-simulation. This creates the illusion that the eye is winking and the person desiring sleep and viewing the device will, when the device is successfully used, begin to count the times the eye seems to wink and after a little is lulled off to sleep because he has thus concentrated his mind upon the action of the device, and has more or less unconsciously imitated the simulated winking eye or eyes.

Preferably I provide two very small electric light bulbs at the rear of the device or apparatus which are connected up to a suitable source of electricity, and between said two light bulbs I provide a light chamber having two windows or openings through which the light rays are received from said bulbs respectively above and below a partition in said chamber, which partition extends transversely entirely across the eye-simulation that is provided upon a transparent or translucent, preferably central portion of the said support or member and which transparent or translucent portion has the representation of an eye thereon. By any suitable means I interrupt, at very frequent, substantially regular intervals, the current to the electric light bulb supplying light to the upper portion or half of the eye but keep the light rays constantly passing from the other electric light bulb through the lower portion of said eye-simulation. This creates the illusion that the eye-simulation is winking.

Having thus referred broadly to the means for accomplishing the purpose of my invention, I will, without limiting myself thereto, set forth the preferred embodiment of means for practicing my invention and by which the method thereof may be carried out.

I provide a member 1 which may be of any suitable shape, form and size, but which is preferably of inverted saucer-like or concaved disk form and which may be hung upon the wall of the room containing the would-be sleeper, or may be supported upon a bureau or other article of furniture in the room in view of the person lying down and desiring to sleep. The said member 1 may be of any suitable material such as metal or plastic and the shape and form may, of course, be varied within the scope of the invention. Desirably, however, the member is, as above stated, of concave or saucer-like form and is provided at the back with a preferably flat cover 2 that may be secured to the member 1, as by a series of screws 3, to a series of lugs 4 upon the inner wall of the member 1. Said lugs 4 may be of any suitable number, as, for example, four, equally spaced apart, or they may be formed as a continuous flange upon the inner face of the member 1.

At the front of the member 1 (that is, at the left viewing Fig. 2) may be formed a molding or other conformation 5 that surrounds a flat face or portion 6 which itself has an opening of any suitable size, such as indicated at 7, and which also has secured at the inner face thereof two lugs 8, 8 for holding in place a disk 9 of glass or other suitable substantially transparent material.

Surrounding the said glass disk 9 and the supporting lugs 8 at the inner face of the member 1 is a light-chamber the wall whereof is indicated at 10 and which may be of cylindrical form as shown in Figs. 1 to 3 or of any other suitable shape. Such light-chamber may be and preferably is integral with the face or portion 6 and makes a light-excluding contact with the inner surface of the back cover 2, as indicated in Fig. 2. The said wall 10, as shown best in Fig. 3, has two windows or openings 11, 12 close to which, outside thereof are two very small electric light bulbs 13, 14. Said bulbs are so small that the cost of keeping the invention in operation all night, after the person falls asleep, would be but a fraction of a cent.

The said light chamber has therein a transversely extending partition 15 which, as shown in Fig. 1, extends transversely across the center of the eye-simulation which is indicated generally at 16 in Fig. 1. Such eye-simulation extends both above and below the transverse partition 15 so that the light rays from the lower bulb 14 pass constantly through the window or opening 12 into the light chamber 10 and then outwardly through the eye-simulation. The light rays from the other or upper electric light bulb 13 pass only through the window 11 into the light chamber 10 above the transverse partition 15 and thence outwardly to the eye of the person lying down and desiring to go to sleep.

In order to simulate an eye, preferably a human eye, I apply in any suitable way to the inner face of the glass disk 9, as shown best in Fig. 5, a white coating, layer or the like 17 of the full area of said glass disk 9 to simulate the white of the eye, and at the front face of the said glass disk 9 I apply, as shown best in Fig. 5, a simulation 18 of the pupil of an eye of any suitable color, as, for example, blue, and of the proper proportionate size. Such simulation of the pupil of an eye may be a decalcomania or oil transfer or the like. I have found that the best results are obtained by applying the limitation of the white of an eye to the back or inner face of the glass disk 9, as in this way no light is transmitted through the glass 9 from the bulb 13 between the flashes thereof even though the bulb 13 does not wholly cease to emit light but glows faintly between flashes. My invention, however, is not limited to the described means for simulating an eye, though I prefer to apply the simulation of the pupil of an eye to the front or outer face of the glass disk 9.

The two light bulbs 13, 14 are connected in parallel by the wires, indicated generally at 19, 20, which latter extends to a switch 21 provided at any suitable point upon the member 1. From the switch 21 and from the wire 20 the current-carrying main-line wires extend as indicated at 22, 23, and are of any suitable length and are provided with a suitable terminal plug (not shown) by which the device or apparatus may be plugged into a suitable supply of electricity such as a 110 volt line.

I provide any suitable means, indicated generally at 24 in Figs. 3 and 11, for interrupting the current supplied to the electric light bulb 13 at very frequent, substantially regular intervals. While any suitable means may be provided for this purpose, and while my invention is not limited to any particular means, I have indicated in Figs. 6, 7, 8 and 9 two different means for the purpose, that shown in Figs. 6 and 7 being particularly adapted to the relatively small structure shown in Figs. 1 to 5, which structure in actual practice may be about nine inches in diameter, my invention, however, not being limited to any particular size of parts.

In Figs. 6 and 7 is shown at 25 a member preferably of brass and which is secured, as by a base 25', to the inner face of the flat cover 2, and which is connected by a wire 26 to the circuit shown in the diagram Fig. 11 or independently to a suitable source of electricity. Pivoted to the base 25' at 27 is a thermostatic member 28 made up of any two suitable materials for the purpose, such as steel and brass, and about which is wrapped a very fine wire 29, the end 30 whereof is suitably connected to complete a circuit in such manner that the heating of the thermostatic member 28 by the current through the wire 29 causes the said member 28 to separate from contact with the brass member 25 at 31, the contact being remade at 31 after an exceedingly brief interval because of the cooling of the thermostatic member 28, the recontact being caused by the inherent springiness of the thermostatic member 28. This make-and-break is repeated at very short, regular intervals such as every one or two seconds.

In Figs. 8 and 9 is shown means that would or might be employed with a larger, heavier structure for the same purpose, but which is not particularly adapted to the relatively small structure shown in Figs. 1 to 5, though it might be used in other embodiments of my invention. In Figs. 8 and 9 is shown a very small electric motor 32 driven in any suitable manner, as by wiring of a circuit indicated at 33 and having a shaft 34 on which is fast a radial conducting arm 35 adapted to travel about while making suitable contact with the inner face of a suitably supported annular conductor 36 and which latter has an open space or gap at 37 to cause a break in the circuit at every rotation of the shaft 34 with its arm 35.

Other suitable means may be provided for the purpose of making a break in the circuit at very frequent, substantially regular intervals.

The device or apparatus may be provided with any suitable means by which it may be hung upon a wall conveniently near a source of electric current. For that purpose I may provide a loop 36 by which it may be suspended from a hook upon the wall.

In order to prevent overheating of the device or apparatus I provide one or more vent holes such as indicated at 37 in Fig. 4 for the circulation of air, and desirably I so form the member at the back thereof at top and bottom by cutting out or shaping small parts thereof, as indicated in Figs. 1, 2 and 3 at 37′, thereby to permit the circulation of air close to the back cover 2.

In Fig. 10 I have indicated at 38 an open eye and at 39 an eye in the winked condition simulated by the use of the device or apparatus as herein described. During the time when both the electric lights 13 and 14 are in action the appearance of the eye is that shown at 38 in Fig. 10, and at the time when electricity is cut off from the electric bulb 13 the appearance of the eye is that indicated at 39 in Fig. 10.

Although I have referred to the support member 1 as relatively small, so as to be capable of being hung upon a wall or supported upon a bureau, I have also referred to it as of any suitable shape, form and size. I may, within the scope of my invention, apply the invention to some such article of furniture as a clock of any suitable size, the face thereof at some suitable part having a transparent or translucent portion whereon is the simulation of one eye or of two eyes, preferably as close together as the human eyes are, and in the event of simulating two eyes (that is, both eyes of a person), certain parts of the device or means hereinabove described will be duplicated, so as to create the illusion of the winkling of both eyes, preferably at the same time. That is, if two eyes of a person are represented I would preferably have two small electric light bulbs behind each eye, with a partitioned light-chamber for each eye, but within the scope of my invention I may employ only two electric light bulbs, one of which will transmit light rays to the upper portion of both eyes and the other of which will transmit light rays to the lower portion of both eyes, in which case the two eyes will wink simultaneously when the upper light is cut off at the described frequent short intervals. Or if I employ two lights for each of the two eyes, the electrical connections may be such that the two eyes wink in alternation, though I may cause them to wink simultaneously.

The eye-simulation is effected or provided in the same manner as hereinbefore described, if two eyes are used, and the wiring connections are such as to effect the intermittent cutting off of light rays to the upper part of both eyes, either simultaneously or in alternation. In any case the transverse partition for an eye may be straight or slightly curved as shown.

Having thus described the method of my invention and the best means known to me for carrying out the same, it is to be understood that although specific terms are employed, they are used in a generic and descriptive sense and not for purposes of limitation, the scope of the invention being set forth in the following claims.

I claim:

1. That method for inducing sleep comprising establishing the semblance of an eye capable of transmitting light, in a bedroom, apartment or the like, in view of a person desiring to sleep; transmitting constantly, through the lower part of said eye, rays of light from an artificial source of light behind said eye; transmitting light rays from a source of artificial light behind said eye through the upper part of said eye; and at very frequent, substantially regular intervals interrupting briefly the light rays through the upper part of said eye, thereby simulating in the mind of such person the winking of the said eye, and thereby producing imitation and inducing sleep through the regularity of the winking simulation.

2. Means for inducing sleep comprising a supporting member having a portion thereof capable of transmitting rays of lights and adapted to be supported in a bedroom, apartment or the like, in view of a person desiring to sleep; a light-transmitting eye-simulation at said light-transmitting portion of said member; at least one source of artificial light behind said eye-simulation so positioned that the light rays pass through both the upper and the lower portions of said eye-simulation; and means for interrupting at very frequent, substantially regular intervals the light rays through the upper part of said eye-simulation, thereby creating the illusion of the winking of said eye in the mind of said person desiring sleep, and thus producing imitation and inducing sleep through the regularity of the winking-simulation.

3. Means for inducing sleep comprising a supporting member having a portion thereof capable of transmitting rays of light and adapted to be supported in a bedroom, apartment or the like, in view of a person desiring to sleep; a light-transmitting eye-simulation at said light-transmitting portion of said member; two sources of artificial light in the rear of said member and so positioned as respectively to transmit light rays through the upper and through the lower portions of said eye-simulation, and means for interrupting at very frequent, substantially regular intervals the light rays from the source of light through the upper portion of said eye-simulation, thereby creating the illusion of the winking of said eye in the mind of said person desiring to sleep, and thus producing imitation and inducing sleep through the regularity of such winking simulation.

4. Means for inducing sleep in accordance with claim 3, but wherein at the rear of the said member between said two sources of artificial light, there is provided a light chamber into which light is admitted from said two sources of artificial light, and which light chamber surrounds that portion of said member capable of transmitting light rays outward to the eyes of the said person.

5. Means for inducing sleep in accordance with claim 3, but wherein at the rear of the said member between said two sources of artificial light, there is provided a light chamber into which light is admitted from said two sources of artificial light, and which light chamber surrounds that portion of said member capable of transmitting light rays outward to the eyes of the said person, said light chamber having a transverse partition extending across said eye-simulation substantially centrally thereof.

6. Means for inducing sleep in accordance with claim 3, but wherein the said two sources of artificial light are two very small electric light bulbs electrically connected to a source of electricity, and means to break the circuit to the light bulb transmitting light rays through the upper portion of said eye-simulation at very frequent, substantially regular intervals, while maintaining the circuit to the other light bulb.

7. Means for inducing sleep in accordance with claim 3, but wherein means is provided to circulate air through the interior of such concave disk member to avoid overheating.

8. Means for inducing sleep in accordance with claim 3, but wherein at the rear of the said member between said two sources of artificial light, there is provided a light chamber into which light is admitted from said two sources of artificial light, and which light chamber surrounds that portion of said member capable of transmitting light rays outward to the eyes of the said person, the said light chamber being substantially cylindrical in form and having in the wall thereof two windows adapted respectively to admit light rays from the two artificial sources of said light.

9. Means for inducing sleep in accordance with claim 3, but wherein the eye-simulation consists of a very thin sheet of white, light-transmitting material upon the inner face of the said portion of the said member that is capable of transmitting rays of light, and an applied sheet on the front or outer face of the said light transmitting portion of said member to simulate the pupil of an eye.

CHESTER W. JOHNSON.

REFERENCES CITED

The following references are of record in the file of this patent:

FOREIGN PATENTS

| Number | Country | Date |
|---|---|---|
| 29,863 | France | Nov. 10, 1925 |